US012687872B2

(12) United States Patent
Lai et al.

(10) Patent No.: US 12,687,872 B2
(45) Date of Patent: Jul. 21, 2026

(54) LOW DROPOUT REGULATOR APPARATUS HAVING NOISE-SUPPRESSION MECHANISM

(71) Applicant: REALTEK SEMICONDUCTOR CORPORATION, Hsinchu (TW)

(72) Inventors: Yen-Po Lai, Hsinchu (TW); Chih-Lung Chen, Hsinchu (TW); Yi Feng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 233 days.

(21) Appl. No.: 18/607,606

(22) Filed: Mar. 18, 2024

(65) Prior Publication Data

US 2024/0329678 A1 Oct. 3, 2024

(30) Foreign Application Priority Data

Mar. 28, 2023 (TW) ................................ 112111837

(51) Int. Cl.
*G05F 1/575* (2006.01)
*G05F 1/565* (2006.01)
*G05F 3/26* (2006.01)

(52) U.S. Cl.
CPC .............. *G05F 1/575* (2013.01); *G05F 1/565* (2013.01); *G05F 3/262* (2013.01)

(58) Field of Classification Search
CPC . G05F 1/56; G05F 1/565; G05F 3/262; G05F 1/575
See application file for complete search history.

(56) References Cited

U.S. PATENT DOCUMENTS

2016/0308497 A1* 10/2016 Park ........................ G05F 1/625
2017/0090493 A1* 3/2017 Cui ......................... G05F 1/575
2020/0012303 A1* 1/2020 Stanzione ............... G05F 1/565
(Continued)

FOREIGN PATENT DOCUMENTS

CN 204065894 U * 12/2014
CN 208027206 U * 10/2018

OTHER PUBLICATIONS

Razavi, Behzad. "Design of Analog CMOS Integrated Circuits." (2016) (p. 83-p. 89).

*Primary Examiner* — Sisay G Tiku
(74) *Attorney, Agent, or Firm* — WPAT, PC

(57) ABSTRACT

The present disclosure discloses a low dropout regulator apparatus having noise-suppression mechanism. An operational amplifier circuit includes a differential input circuit, an amplifying output circuit and a first and a second resistive components. The differential input circuit is coupled between first connection nodes and a ground terminal to receive a reference voltage and a feedback voltage. The amplifying output circuit includes a first and a second transistor pair circuits. The first transistor pair circuit is coupled between a power supply and second connection nodes. The second transistor pair is coupled between the second connection nodes and the ground terminal and has an amplifying output terminal generating an amplified voltage. The first and the second resistive components are coupled between the first and the second connection nodes. A voltage stabilizing output circuit receives the amplified voltage to generate an output voltage and generates the feedback voltage according to a division thereof.

10 Claims, 5 Drawing Sheets

110

(56) References Cited

U.S. PATENT DOCUMENTS

| | | | | |
|---|---|---|---|---|
| 2024/0094754 | A1* | 3/2024 | Rai | G05F 1/575 |
| 2024/0126314 | A1* | 4/2024 | Feng | G05F 1/595 |
| 2024/0264619 | A1* | 8/2024 | Banerjee | G05F 1/575 |
| 2024/0295891 | A1* | 9/2024 | Kumar | G05F 1/575 |

* cited by examiner

LOW DROPOUT REGULATOR APPARATUS HAVING NOISE-SUPPRESSION MECHANISM

BACKGROUND OF THE INVENTION

1. Field of the Invention

The present disclosure relates to a low dropout regulator apparatus having noise-suppression mechanism.

2. Description of Related Art

A low-dropout regulator (LDO) is a type of linear direct current (DC) voltage stabilizer used to provide a stable DC voltage power. Comparing to common linear DC voltage stabilizers, the low-dropout regulator is able to operate under a relatively smaller voltage difference between an output voltage and an input voltage.

Under an operation state, the low-dropout regulator receives a reference voltage and a feedback voltage to generate an output voltage accordingly, in which the feedback voltage is generated by dividing the output voltage. However, the reference voltage is easily affected by noises from different sources to influence the output voltage. If no appropriate noise-suppression mechanism is presented, the output accuracy of the low-dropout regulator decreases due to the interference of the noise.

SUMMARY OF THE INVENTION

In consideration of the problem of the prior art, an object of the present disclosure is to provide a low dropout regulator apparatus having noise-suppression mechanism.

The present invention discloses a low dropout regulator apparatus having noise-suppression mechanism that includes an operational amplifier circuit and a voltage stabilizing output circuit. The operational amplifier circuit includes a differential input circuit, an amplifying output circuit, a first resistive component and a second resistive component. The differential input circuit is electrically coupled between a pair of first connection nodes and a ground terminal and configured to receive a reference voltage and a feedback voltage. The amplifying output circuit includes a first transistor pair circuit and a second transistor pair circuit. The first transistor pair circuit is electrically coupled between a supply power and a pair of second connection nodes. The second transistor pair circuit is electrically coupled between the second connection nodes and the ground terminal and comprising an amplifying output terminal configured to generate an amplified voltage. The first resistive component is electrically coupled between a first one of the first connection nodes and a first one of second connection nodes. The second resistive component is electrically coupled between a second one of the first connection nodes and a second one of the second connection nodes. The voltage stabilizing output circuit receives the amplified voltage to generate an output voltage and to divide the output voltage to generate the feedback voltage.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a low dropout regulator apparatus having noise-suppression mechanism to dispose the first resistive component and the second resistive component so as to increase the power supply rejection ratio (PSSR) of internal nodes of the operational amplifier circuit. The effect of the power noise on the received reference voltage can be avoided such that the output voltage is not interfered by the noise to accomplish the noise-suppression mechanism.

Figure 1:
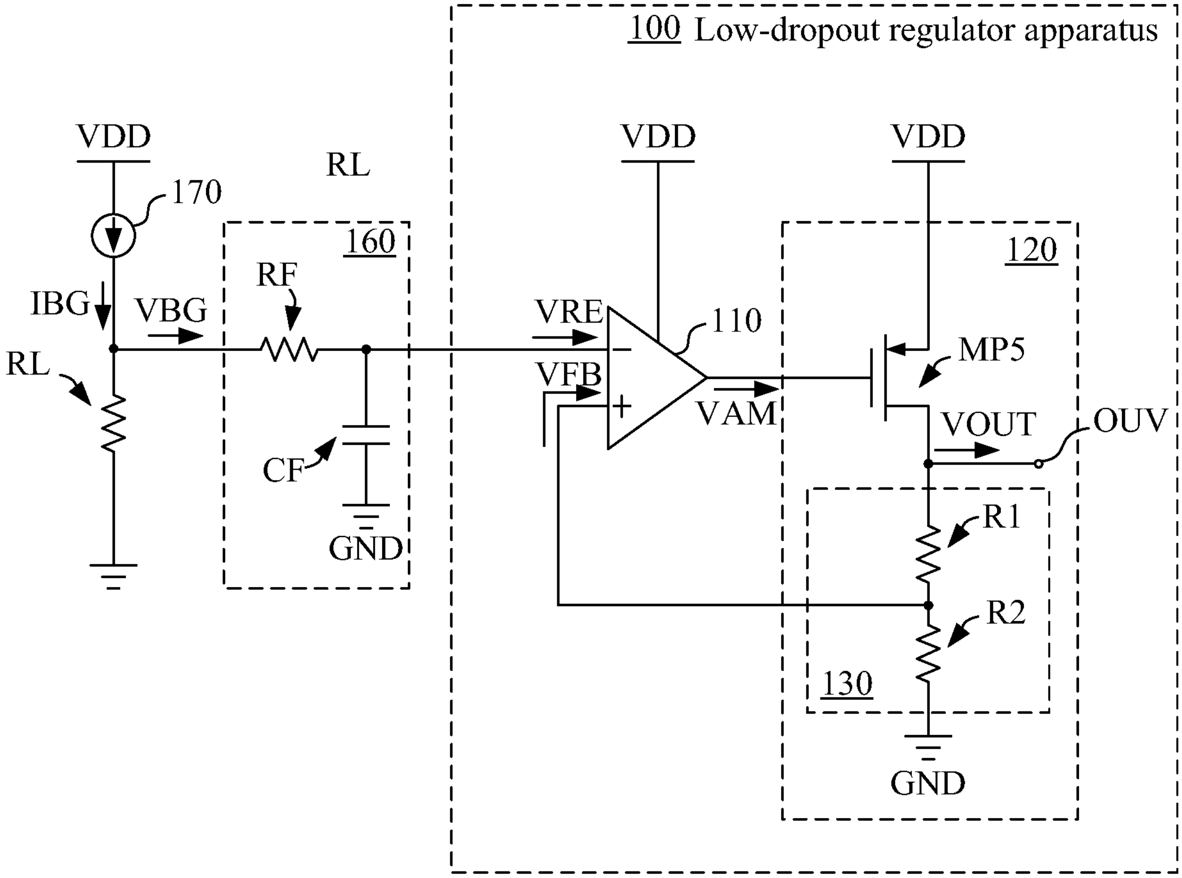
FIG. 1 illustrates a block diagram of a low-dropout regulator apparatus having noise-suppression mechanism according to an embodiment of the present invention.

Reference is now made to FIG. 1. FIG. 1 illustrates a block diagram of a low-dropout regulator apparatus 100 having noise-suppression mechanism according to an embodiment of the present invention. The low-dropout regulator apparatus 100 includes an operational amplifier circuit 110 and a voltage stabilizing output circuit 120.

The operational amplifier circuit 110 is configured to receive a reference voltage VRE and a feedback voltage VFB to generate an amplified voltage VAM accordingly. The voltage stabilizing output circuit 120 is configured to receive the amplified voltage VAM to generate an output voltage VOUT and to divide the output voltage VOUT to generate the feedback voltage VFB.

In an embodiment, the reference voltage VRE is generated by a low-pass filter circuit 160 that receives a bandgap voltage VBG and performs low-pass filtering thereon, in which the bandgap voltage VBG is generated by a bandgap current IBG passing through a load RL.

The bandgap current IBG can be generated by a bandgap reference circuit 170 operating according to a supply power VDD. The bandgap current IBG has a temperature coefficient of 0 (or close to 0). More specifically, the current value of the bandgap current IBG does not (barely does not) vary due to the influence of the temperature.

The low-pass filter circuit 160 includes a resistor RF and a capacitor CF. The resistor RF is electrically coupled between a first terminal and a second terminal, the first terminal being configured to receive the bandgap voltage VBG and the second terminal being configured to generate the reference voltage VRE. The capacitor CF is electrically coupled between the second terminal and a ground terminal GND.

In an embodiment, a resistance of the resistor RF has an order between $10^4$ and $10^8$, such as but not limited to 8 million (M) Ohm. In other embodiments, the resistance of the resistor RF can be determined based on the system requirement and is not limited to the range described above. The noise of the supply power VDD can be fed to the bandgap current IBG and influence the bandgap voltage VBG. By using the configuration described above, the low-pass filter circuit 160 has a relatively lower bandwidth to filter out the noise in the range beyond several thousand Hertz in the bandgap voltage VBG.

However, when the operational amplifier circuit 110 that operates according to the supply power VDD as well has no noise suppression mechanism, the noise of the supply power VDD is easily fed to the reference voltage VRE through the internal path of the operational amplifier circuit 110 due to the large resistance of the resistor RF such that the PSSR of the reference voltage VRE decreases.

The low-dropout regulator apparatus 100 of the present invention avoids the issue described above by using the noise-suppression mechanism. The configuration of the operational amplifier circuit 110 and the voltage stabilizing output circuit 120 in the low-dropout regulator apparatus 100 is described in detail in the following paragraphs to further describe the noise-suppression mechanism used in the present invention.

Figure 2:
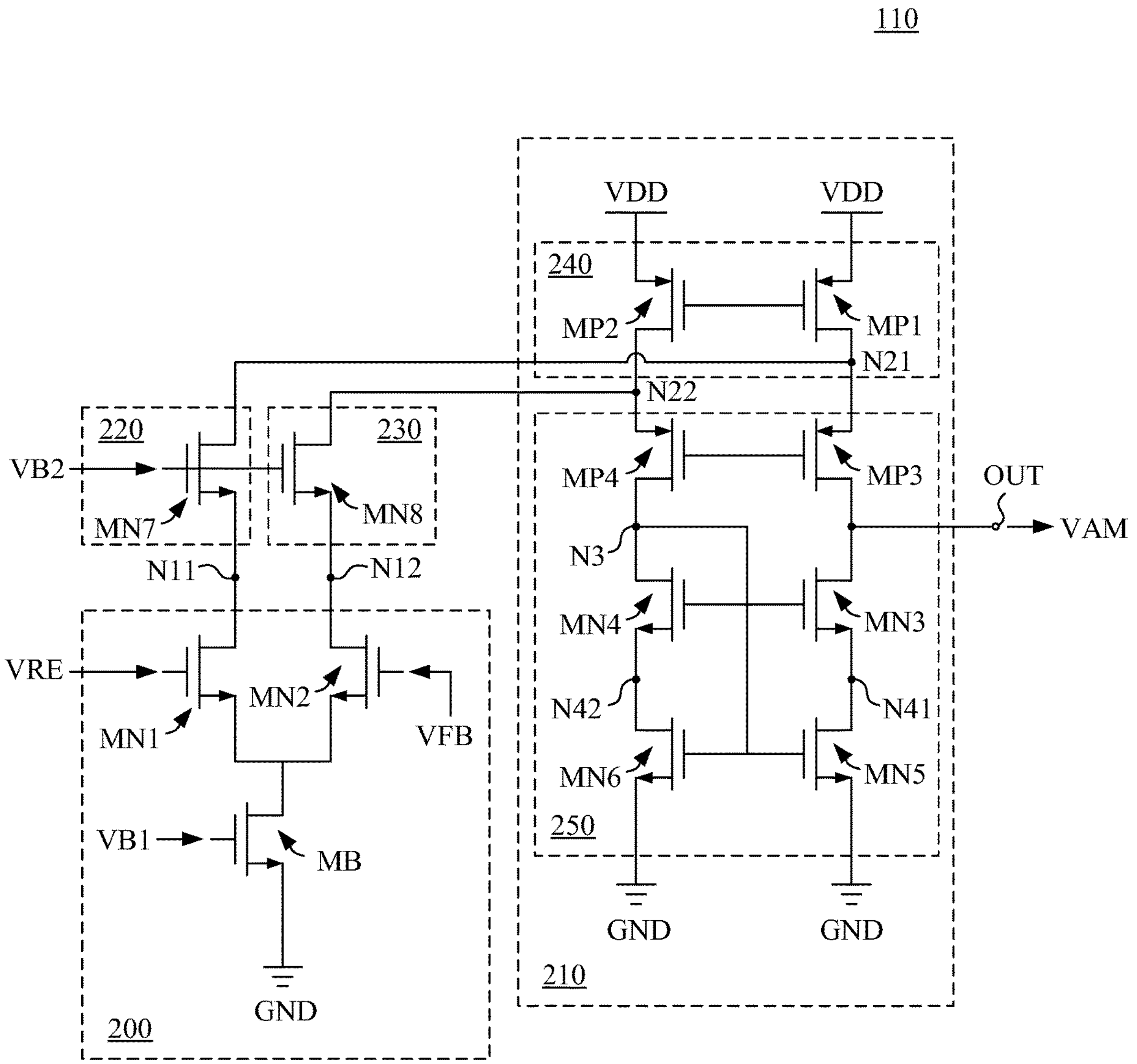
FIG. 2 illustrates a circuit diagram of the operational amplifier circuit according to an embodiment of the present invention.

Reference is now made to FIG. 2. FIG. 2 illustrates a circuit diagram of the operational amplifier circuit 110 according to an embodiment of the present invention.

In an embodiment, the operational amplifier circuit 110 is a folded cascode amplifier and includes a differential input circuit 200, an amplifying output circuit 210, a first resistive component 220 and a second resistive component 230.

The differential input circuit 200 is electrically coupled between the ground terminal GND and a pair of first connection nodes N11 and N12 and is configured to receive the reference voltage VRE and the feedback voltage VFB.

In an embodiment, the differential input circuit 200 includes a pair of input transistors MN1 and MN2 and a bias load transistor MB.

In the present embodiment, each of the input transistors MN1 and MN2 is an N-type transistor. The input transistors MN1 and MN2 respectively receive one of the reference voltage VRE and the feedback voltage VFB through a pair of gates thereof (in which the input transistor MN1 receives the reference voltage VRE and the input transistor MN2 receives the feedback voltage VFB) and are electrically coupled to the pair of the first connection nodes N11 and N12 through a pair of drains thereof. More specifically, in the present embodiment, the gate of the input transistor MN1 receives the reference voltage VRE and the drain of the input transistor MN1 is electrically coupled to the first connection node N11. The gate of the input transistor MN2 receives the feedback voltage VFB and the drain of the input transistor MN2 is electrically coupled to the first connection node N12.

In the present embodiment, the bias load transistor MB is an N-type transistor and is electrically coupled between the ground terminal GND and a pair of sources of the input transistors MN1 and MN2. More specifically, in the present embodiment, the drain of the bias load transistor MB is electrically coupled to the sources of the input transistors MN1 and MN2. The source of the bias load transistor MB is electrically coupled to the ground terminal GND. The gate of the bias load transistor MB receives bias voltage VB1 to operate as a current source.

The amplifying output circuit 210 includes a first transistor pair circuit 240 and a second transistor pair circuit 250.

The first transistor pair circuit 240 is electrically coupled between the supply power VDD and a pair of second connection nodes N21 and N22. In an embodiment, the first transistor pair circuit 240 includes a pair of transistors MP1 and MP2 each being a P-type transistor. The source of the transistor MP1 is electrically coupled to the supply power VDD. The drain of the transistor MP1 is electrically coupled to the second connection node N21. The source of the transistor MP2 is electrically coupled to the supply power VDD. The drain of the transistor MP2 is electrically coupled to the second connection node N22. The gates of the transistors MP1 and MP2 are electrically coupled together and can be further selectively electrically coupled to a bias voltage (not illustrated in the figure).

The second transistor pair circuit 250 is electrically coupled between the ground terminal GND and the pair of second connection nodes N21 and N22 and includes an amplifying output terminal OUT configured to generate the amplified voltage VAM. In an embodiment, the second transistor pair circuit 250 includes a pair of transistors MP3 and MP4 each being a P-type transistor, a pair of transistors MN3 and MN4 each being an N-type transistor and a pair of transistors MN5 and MN6 each being an N-type transistor.

The source of the transistor MP3 is electrically coupled to the second connection node N21. The drain of the transistor MP3 is electrically coupled to the amplifying output terminal OUT. The source of the transistor MP4 is electrically coupled to the second connection node N22. The drain of the transistor MP4 is electrically coupled to a connection node N3. The gates of the transistors MP3 and MP4 are electrically coupled together and can be further selectively electrically coupled to a bias voltage (not illustrated in the figure).

The drain of the transistor MN3 is electrically coupled to the amplifying output terminal OUT. The source of the transistor MN3 is electrically coupled to a connection node N41. The drain of the transistor MN4 is electrically coupled to the connection node N3. The source of the transistor MN4 is electrically coupled to a connection node N42. The gates of the transistor MN3 and MN4 are electrically coupled together and are further electrically coupled to the drain of the transistor MN4.

The drain of the transistor MN5 is electrically coupled to the connection node N41. The source of the transistor MN5 is electrically coupled to the ground terminal GND. The drain of the transistor MN6 is electrically coupled to the connection node N42. The source of the transistor MN6 is electrically coupled to the ground terminal GND. The gates of the transistor MN5 and MN6 are electrically coupled together and are further electrically coupled to the drain of the transistor MN4.

In the configuration described above, the first transistor pair circuit 240 and a first part (transistors MP3 and MP4) of the second transistor pair circuit 250 are configured to be a cascode transistor circuit. A second part (transistors MN3, MN4, MN5 and MN6) of the second transistor pair circuit 250 is configured to be a cascode current source. The amplifying output terminal OUT is between the cascode transistor circuit and cascode current source.

The first resistive component 220 is electrically coupled between a first one of the pair of first connection nodes N11 and N12 and a first one of the pair of second connection nodes N21 and N22. The second resistive component 230 is electrically coupled between a second one of the pair of first connection nodes N11 and N12 and a second one of the pair of second connection nodes N21 and N22.

More specifically, in the present embodiment, the first resistive component 220 is electrically coupled between the first connection node N11 and the second connection node N21. The second resistive component 230 is electrically coupled between the first connection node N12 and the second connection node N22.

In the present embodiment, the first resistive component 220 includes a transistor MN7 that is an N-type metal-oxide-semiconductor field-effect transistor (MOSFET). The second resistive component 230 includes a transistor MN8 that is an N-type MOSFET. The gates of the transistors MN7 and MN8 receive a bias voltage VB2 to provide a corresponding resistance according to the amount of the bias voltage VB2.

Reference is now made to FIG. 1 again. The voltage stabilizing output circuit 120 includes an output transistor MP5 that is a P-type transistor and a voltage-dividing resistor circuit 130.

The output transistor MP5 is controlled by the amplified voltage VAM. The voltage-dividing resistor circuit 130 and the output transistor MP5 are electrically coupled in series through a voltage-stabilizing output terminal OUV. In an embodiment, the voltage-dividing resistor circuit 130 includes a resistor R1 and a resistor R2 to divide the output voltage VOUT outputted from the voltage-stabilizing output terminal OUV according to a resistance ratio between the resistor R1 and the resistor R2 to generate the feedback voltage VFB.

In an embodiment, a first equivalent impedance value of the first transistor pair circuit 240 is smaller than a second equivalent impedance value of the second transistor pair circuit 250 such that the second connection nodes N21 and N22 has the PSSR close to 0 dB due to the voltage-dividing of the resistors. Under such a condition, the noise of the supply power VDD easily affects the voltages of the second connection nodes N21 and N22. If the input transistors MN1 and MN2 of the differential input circuit 200 are directly electrically coupled to the second connection nodes N21 and N22, the reference voltage VRE is easily affected by the noise as well.

Under a proper selection of the resistances, the first resistive component 220 and the second resistive component 230 allow the divided voltages of the first connection nodes N11 and N12 in the operational amplifier circuit 110 to be smaller than the divided voltages of the second connection nodes N21 and N22. As a result, the first resistive component 220 and the second resistive component 230 controls an absolute value of the PSSR of the first connection nodes N11 and N12 to be larger than a predetermined value due to the voltage dividing result. The predetermined value is higher than the PSSR of the second connection nodes N21 and N22 that is close to 0 dB.

As a result, comparing to the second connection nodes N21 and N22, the first connection nodes N11 and N12 have higher resistance ability against the noise of the supply power VDD to keep the reference voltage VRE from being influenced by the noise. The amplified voltage VAM and the output voltage VOUT generated subsequently can be free from the influence of the noise as well.

Figure 3A:
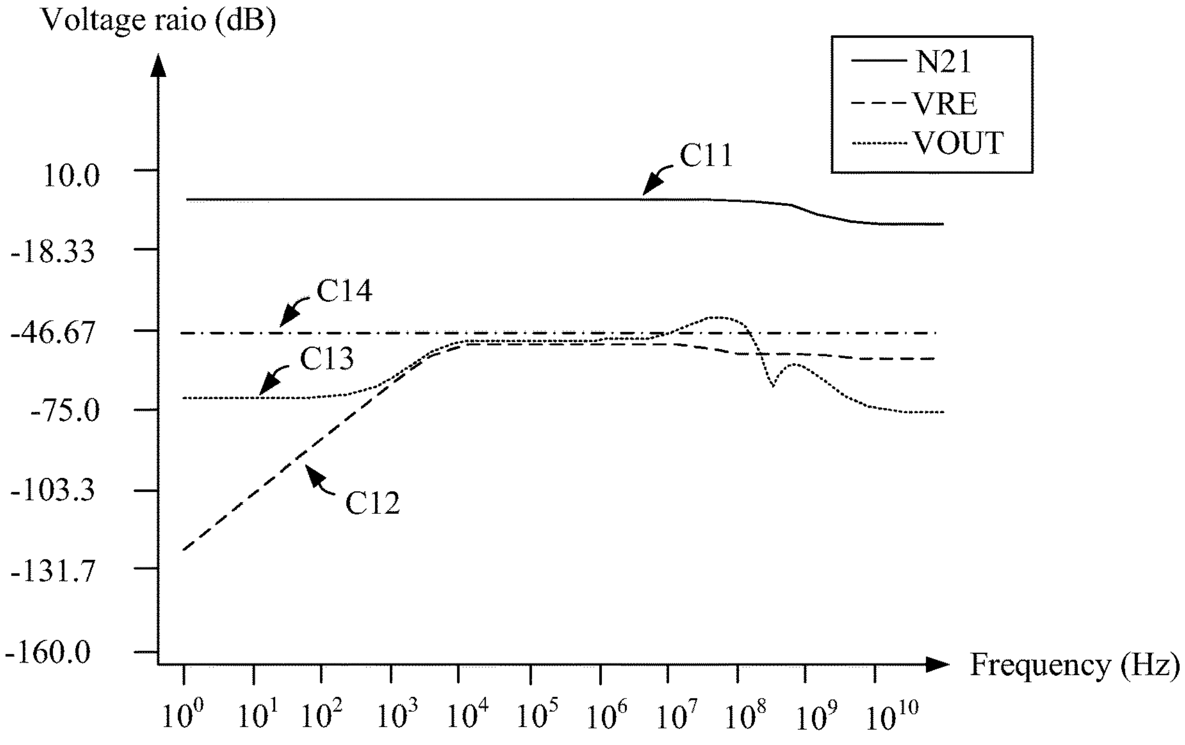
FIG. 3A illustrates a diagram of the waveform of the PSSR of a plurality of nodes in the low-dropout regulator apparatus under the condition that the first resistive component and the second resistive component are not disposed according to an embodiment of the present invention.
Figure 3B:
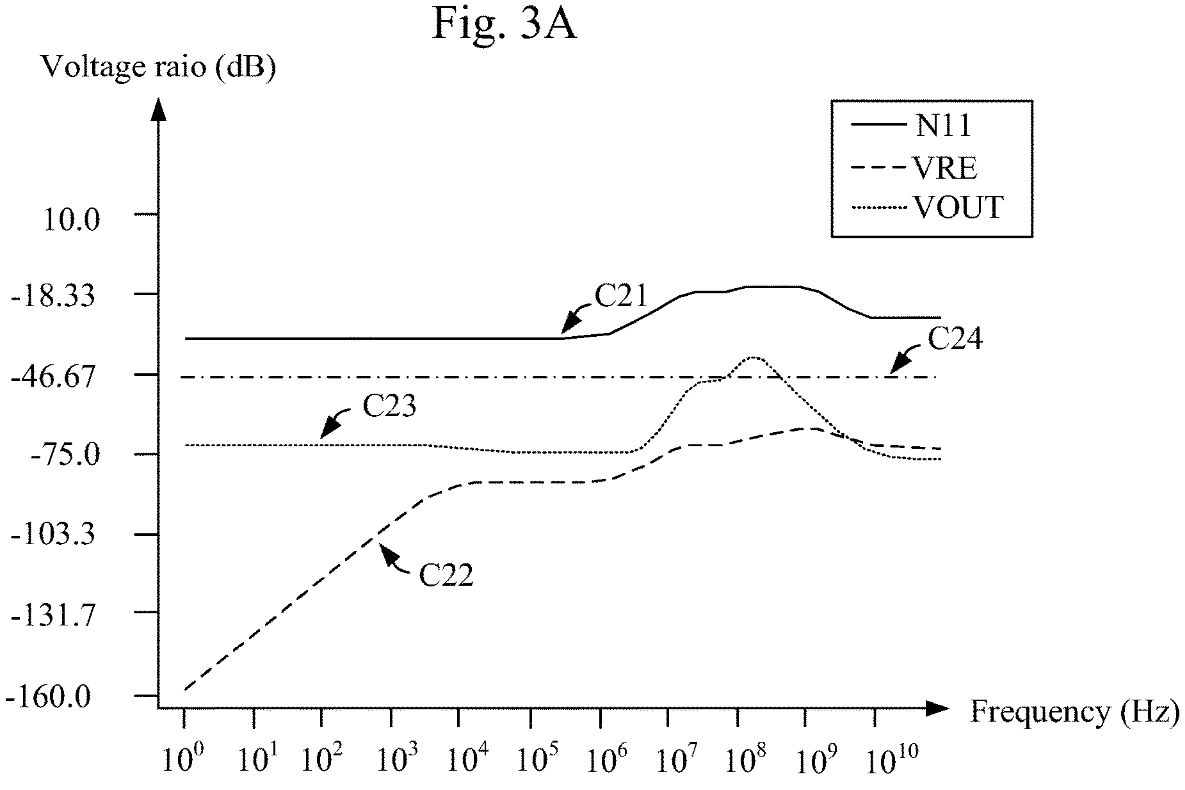
FIG. 3B illustrates a diagram of the waveform of the PSSR of a plurality of nodes in the low-dropout regulator apparatus under the condition that the first resistive component and the second resistive component are disposed according to an embodiment of the present invention.

Reference is now made to FIG. 3A and FIG. 3B. FIG. 3A illustrates a diagram of the waveform of the PSSR of a plurality of nodes in the low-dropout regulator apparatus 100 under the condition that the first resistive component 220 and the second resistive component 230 are not disposed according to an embodiment of the present invention. FIG. 3B illustrates a diagram of the waveform of the PSSR of a plurality of nodes in the low-dropout regulator apparatus 100 under the condition that the first resistive component 220 and the second resistive component 230 are disposed according to an embodiment of the present invention.

In FIG. 3A and FIG. 3B, the X-axis stands for frequency and has a unit of Hertz in log scale with the base value of 10. The Y-axis stands for voltage ratio that shows a ratio between an input power variation amount and an output voltage variation amount and has a unit of dB.

In FIG. 3A, the curve C11 illustrated with a solid line is the PSSR of the second connection node N21. The curve C12 illustrated with a dashed line is the PSSR of the reference voltage VRE. The curve C13 illustrated with a dotted line is the PSSR of the output voltage VOUT. The straight line C14 illustrated with a line interlaced with dots and dashed lines is the PSSR of the reference voltage VRE and the output voltage VOUT in the frequency range of roughly $10^3$ to $10^7$.

In FIG. 3B, the curve C21 illustrated with a solid line is the PSSR of the first connection node N11. The curve C22 illustrated with a dashed line is the PSSR of the reference voltage VRE. The curve C23 illustrated with a dotted line is the PSSR of the output voltage VOUT. The straight line C24 stands for the same meaning with that of the curve C14 in FIG. 3A.

By comparing FIG. 3A and FIG. 3B, the PSSR of the first connection node N11 in FIG. 3B is roughly −30 dB, and the absolute value thereof is higher than the absolute value of the PSSR of the second connection node N21 that is close to 0 dB in FIG. 3A. The improvement of the PSSR of the first connection node N11 allows the amount of the direct current gain of the reference voltage VRE moves downward such that the PSSR of the reference voltage VRE in FIG. 3B moves downward comparing to FIG. 3A (which is equivalent to the result of the increase of the absolute value). The PSSR of the output voltage VOUT can thus be improved.

Figure 4A:
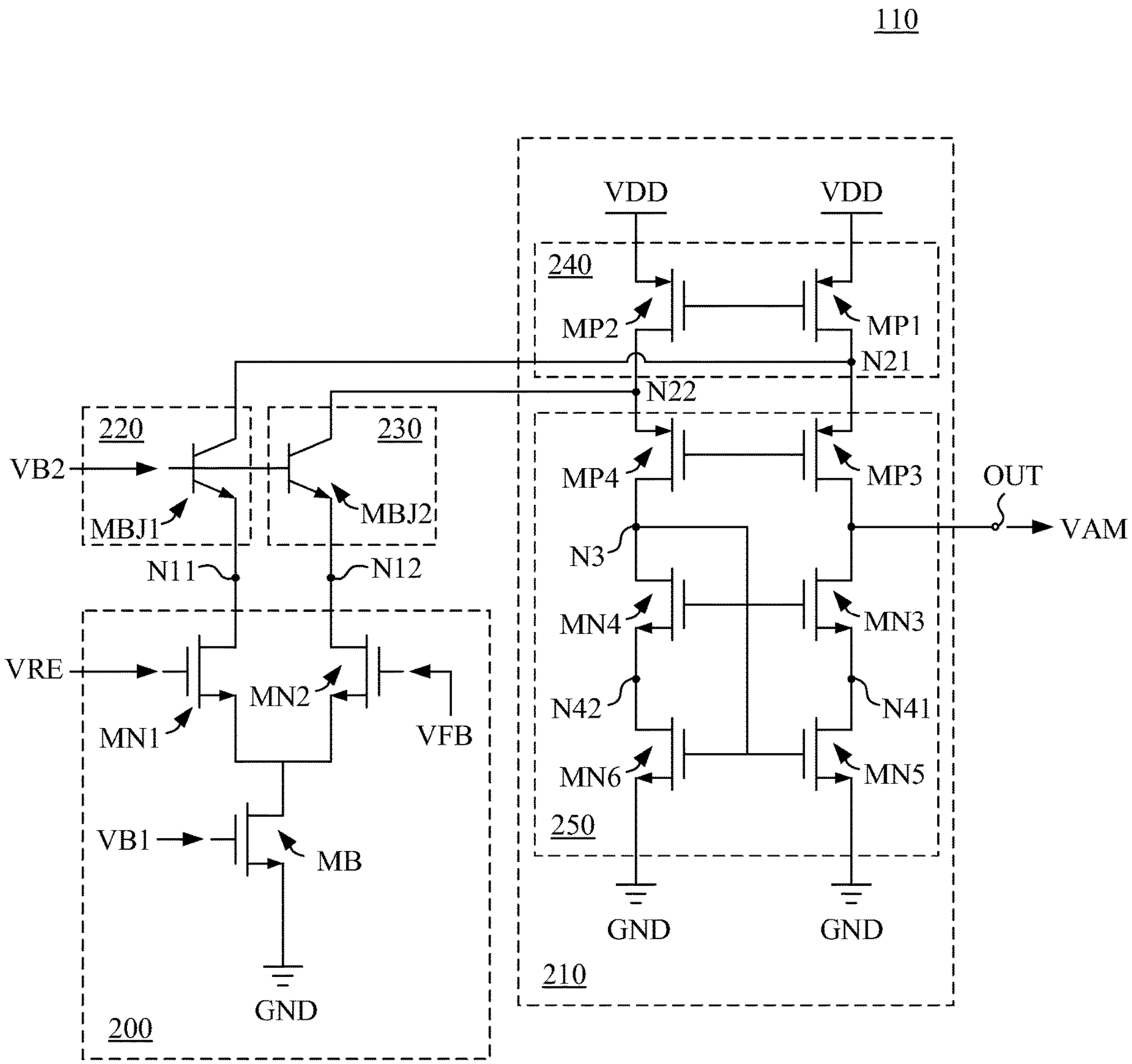
FIG. 4A and FIG. 4B respectively illustrate a circuit diagram of the operational amplifier circuit according to another embodiment of the present invention.
Figure 4B:
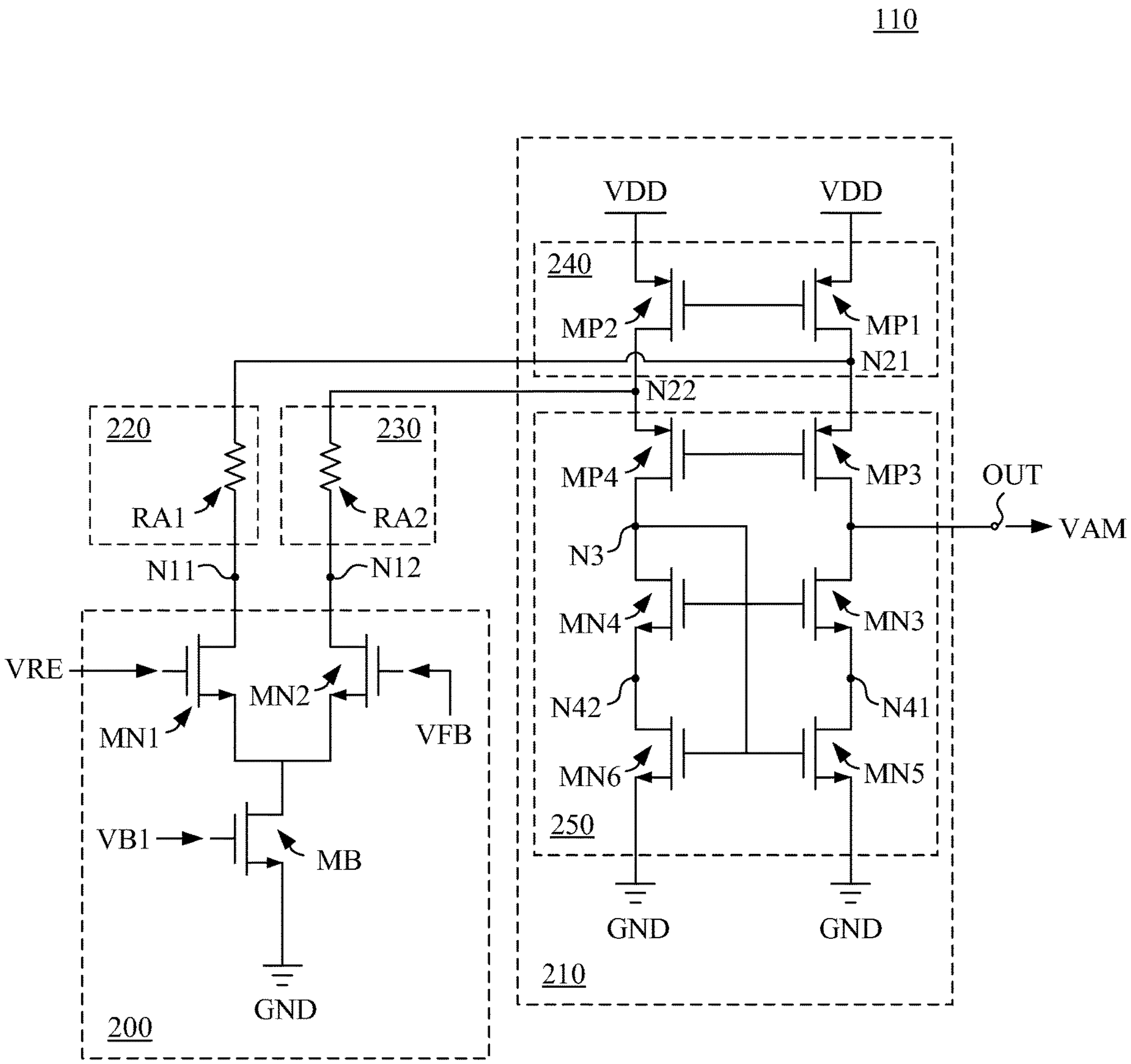

Reference is now made to FIG. 4A and FIG. 4B. FIG. 4A and FIG. 4B respectively illustrate a circuit diagram of the operational amplifier circuit 110 according to another embodiment of the present invention. The operational amplifier circuit 110 illustrated in FIG. 4A and FIG. 4B is similar to the operational amplifier circuit 110 illustrated in FIG. 2. The identical components are not described herein.

The difference between the operational amplifier circuit 110 illustrated in FIG. 4A and FIG. 4B and the operational amplifier circuit 110 illustrated in FIG. 2 is the implementation of the first resistive component 220 and the second resistive component 230. In FIG. 4A, the first resistive component 220 includes a transistor MBJ1 that is a bias NPN-type bipolar junction transistor (BJT). The second resistive component 230 includes a transistor MBJ2 that is a bias NPN-type BJT. In FIG. 4B, the first resistive component 220 includes a resistor RA1. The second resistive component 230 includes a resistor RA2.

In addition, the number and the resistance value of each of the components included in the first resistive component 220 and the second resistive component 230 described can be different depending on practical requirements. For example, the number and the resistance value of each of the components can be configured to be in a proper range to increase a certain degree of the PSSR and guarantee the enough headroom of each of the node voltages.

It is appreciated that the embodiments described above are merely an example. In other embodiments, it is appreciated that many modifications and changes may be made by those of ordinary skill in the art without departing, from the spirit of the invention.

For example, the configuration of the operational amplifier circuit 110 in FIG. 2 is merely an example. In other embodiments, the amount of the transistor pairs in the operational amplifier circuit 110 can be different depending on practical requirements. The transistors can be replaced by other types of transistors (e.g., replacing the P-type transistors by the N-type transistors or replacing the N-type transistors by the P-type transistors) under a proper adjustment. Moreover, the operational amplifier circuit 110 can also be implemented by other circuit configurations.

More specifically, the present invention is not limited to a specific configuration of the operational amplifier circuit 110. However, once the condition that the PSSR of the connection nodes in the differential input circuit 200 and the amplifying output circuit 210 is too low occurs, the first resistive component 220 and the second resistive component 230 can be disposed to increase the PSSR and suppress the noise.

Further, under the condition that the overall function is not affected, voltage-stabilizing components or filtering components can be selectively disposed in any of the nodes in the low-dropout regulator apparatus 100 in FIG. 1. For example, the resistor RF of the low-pass filter circuit 160 can be electrically coupled in parallel with a switch (not illustrated in the figure) to be turned on or turned off according to the filtering requirements. A voltage-stabilizing capacitor (not illustrated in the figure) can be selectively disposed between the amplifying output terminal OUT and the voltage-stabilizing output terminal OUV. A load capacitor and/or a load voltage source (not illustrated in the figure) coupled to the ground terminal GND can be selectively disposed at the voltage-stabilizing output terminal OUV.

In summary, the low dropout regulator apparatus having noise-suppression mechanism of the present invention disposes the first resistive component and the second resistive component so as to increase the PSSR of internal nodes of the operational amplifier circuit. The effect of the power noise on the received reference voltage can be avoided such that the output voltage is not interfered by the noise to accomplish the noise-suppression mechanism.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A low dropout regulator apparatus having noise-suppression mechanism, comprising:

an operational amplifier circuit comprising: a differential input circuit electrically coupled between a pair of first connection nodes and a ground terminal and configured to receive a reference voltage and a feedback voltage; an amplifying output circuit comprising: a first transistor pair circuit electrically coupled between a supply power and a pair of second connection nodes; and a second transistor pair circuit electrically coupled between the second connection nodes and the ground terminal and comprising an amplifying output terminal configured to generate an amplified voltage, wherein the second connection nodes are between the first transistor pair circuit and the second transistor pair circuit;

a first resistive component electrically coupled between a first one of the first connection nodes and a first one of the second connection nodes; and a second resistive component electrically coupled between a second one of the first connection nodes and a second one of the second connection nodes; and a voltage stabilizing output circuit configured to receive the amplified voltage to generate an output voltage and to divide the output voltage to generate the feedback voltage.

2. The low-dropout regulator apparatus of claim 1, wherein each of the first resistive component and the second resistive component comprises at lease one bias metal-oxide-semiconductor field-effect transistor (MOSFET) or at least one bias bipolar junction transistor (BJT).

3. The low-dropout regulator apparatus of claim 1, wherein each of the first resistive component and the second resistive component comprises a resistor.

4. The low-dropout regulator apparatus of claim 1, wherein the first resistive component and the second resistive component controls an absolute value of a power supply rejection ratio (PSSR) of the first connection nodes to be larger than a predetermined value.

5. The low-dropout regulator apparatus of claim 1, wherein a first equivalent impedance value of the first transistor pair circuit is smaller than a second equivalent impedance value of the second transistor pair circuit.

6. The low-dropout regulator apparatus of claim 1, wherein the reference voltage is generated by a low-pass filter circuit that receives a bandgap voltage and performs low-pass filtering thereon, in which the bandgap voltage is generated by a bandgap current passing through a load and the bandgap current has a temperature coefficient of 0.

7. The low-dropout regulator apparatus of claim 6, wherein the low-pass filter circuit comprises:

a resistor electrically coupled between a first terminal and a second terminal, the first terminal being configured to receive the bandgap voltage and the second terminal being configured to generate the reference voltage, wherein a resistance of the resistor has an order between $10^4$ and $10^8$; and a capacitor electrically coupled between the second terminal and the ground terminal.

8. The low-dropout regulator apparatus of claim 1, wherein the voltage stabilizing output circuit comprises:

an output transistor controlled by the amplified voltage; and a voltage-dividing resistor circuit electrically coupled in series with the output transistor through a voltage-stabilizing output terminal to divide the output voltage outputted from the voltage-stabilizing output terminal to generate the feedback voltage.

9. The low-dropout regulator apparatus of claim 1, wherein the differential input circuit comprises:

a pair of input transistors configured to respectively receive one of the reference voltage and the feedback voltage through a pair of gates thereof and electrically coupled to the first connection nodes through a pair of drains thereof; and a bias load transistor electrically coupled between the ground terminal and a pair of sources of the input transistors.

10. The low-dropout regulator apparatus of claim 1, wherein the operational amplifier circuit is a folded cascode amplifier, the first transistor pair circuit, a first part of the second transistor pair circuit is configured to be a cascode transistor circuit, a second part of the second transistor pair circuit is configured to be a cascode current source, and the amplifying output terminal is between the cascode transistor circuit and the cascode current source.

* * * * *